United States Patent [19]
Klein

[11] 4,287,994
[45] Sep. 8, 1981

[54] WEDGABLE STORAGE RACK

[75] Inventor: Herbert H. Klein, Arlington Heights, Ill.

[73] Assignee: Unarco Industries, Inc., Chicago, Ill.

[21] Appl. No.: 90,536

[22] Filed: Nov. 2, 1979

[51] Int. Cl.³ .............................................. A47F 5/00
[52] U.S. Cl. .................................... 211/191; 403/254
[58] Field of Search ............ 211/191, 189, 190, 208, 211/187; 403/254, 353; 108/107

[56] References Cited

U.S. PATENT DOCUMENTS

| | | | |
|---|---|---|---|
| 2,893,567 | 7/1959 | Steele | 211/191 |
| 3,871,525 | 3/1975 | Al-Dabbagh et al. | 211/191 |
| 4,064,996 | 12/1977 | Shillum | 108/107 X |

FOREIGN PATENT DOCUMENTS 1334784  7/1963  France .............................. 108/107

*Primary Examiner*—Roy D. Frazier
*Assistant Examiner*—Robert W. Gibson, Jr.
*Attorney, Agent, or Firm*—Clement and Ryan

[57] ABSTRACT

A storage rack having specially configured wedging connector assemblies secured to the ends of horizontal load-carrying beams that fit onto upright posts to detachably connect and wedgingly secure the beams to the posts. In the preferred form, each post has a recessed front wall that defines a plurality of finger-receiving openings. Each of the openings has at least one inclined wedging surface that provides tighter engagement of the connector assembly at the end of each load-carrying beam with its associated upright post in response to the downward force exerted by the beam and its load. In order to minimize longitudinal and lateral shifting of the beams under load or upon accidental forklift impact, each of the wedging connector assemblies has a plurality of hook-shaped fingers with inclined camming portions that cammingly engage and securely wedge against the wedging surfaces of the posts.

24 Claims, 6 Drawing Figures

U.S. Patent  Sep. 8, 1981  4,287,994
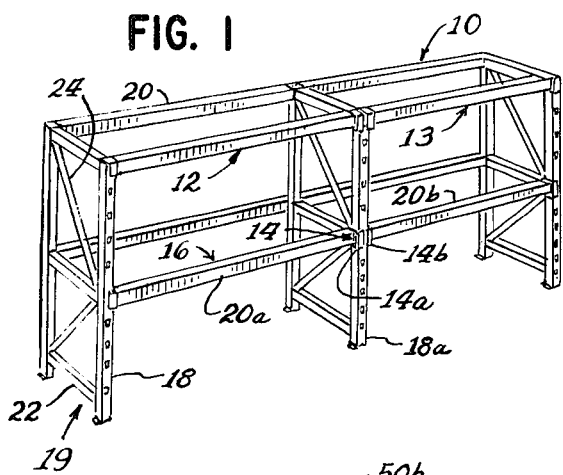
FIG. 1
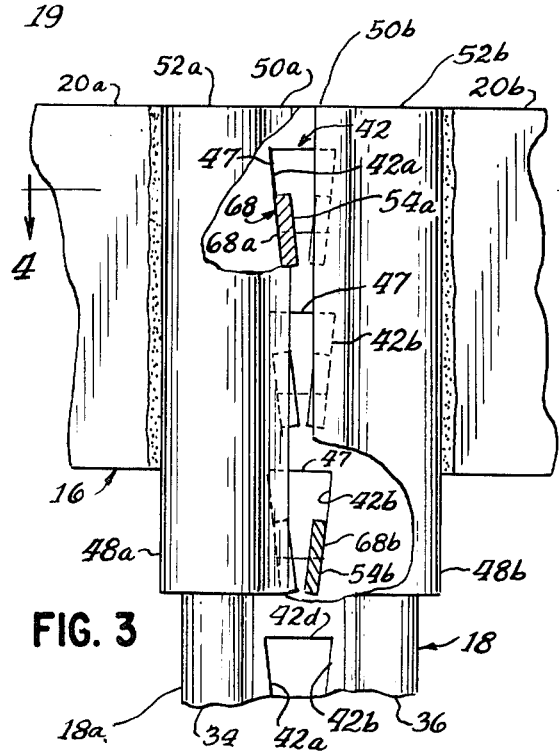
FIG. 2
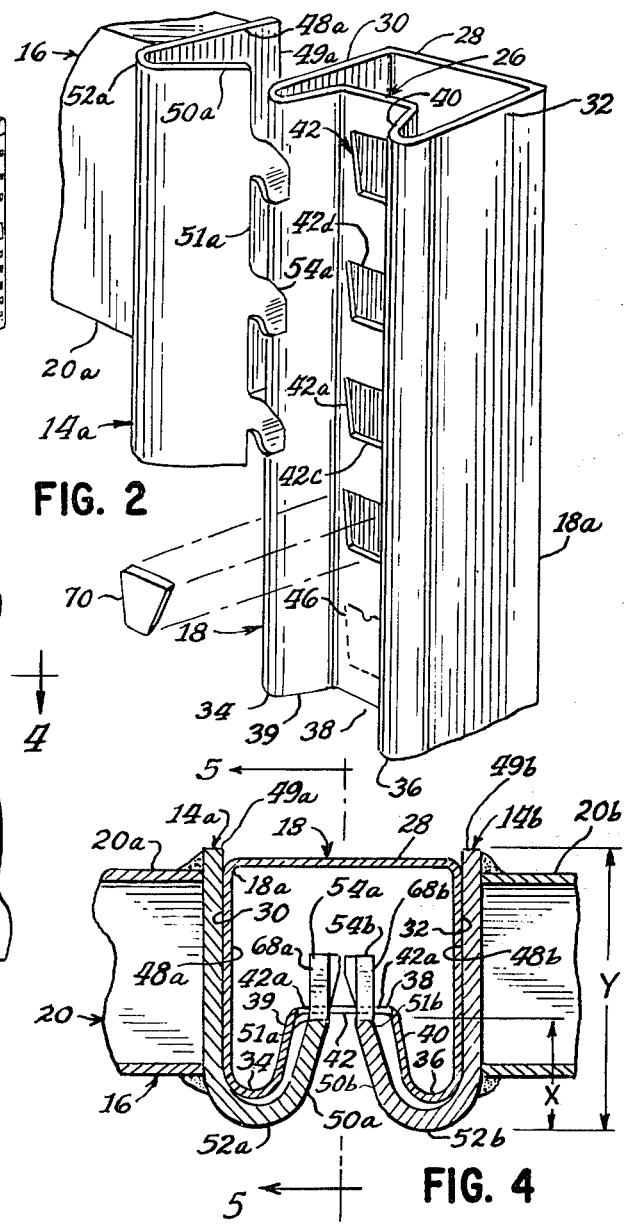
FIG. 3
FIG. 4
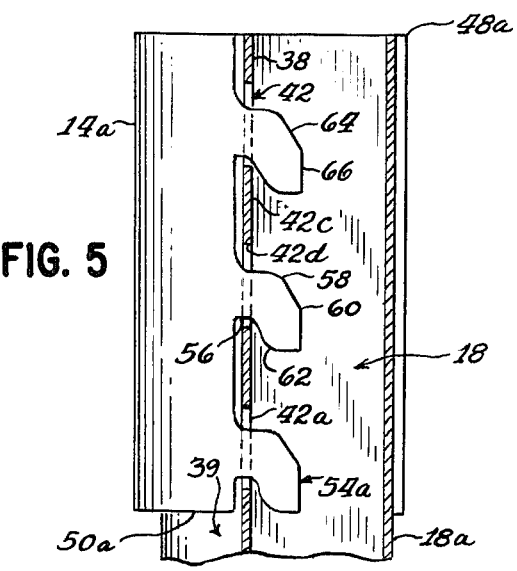
FIG. 5
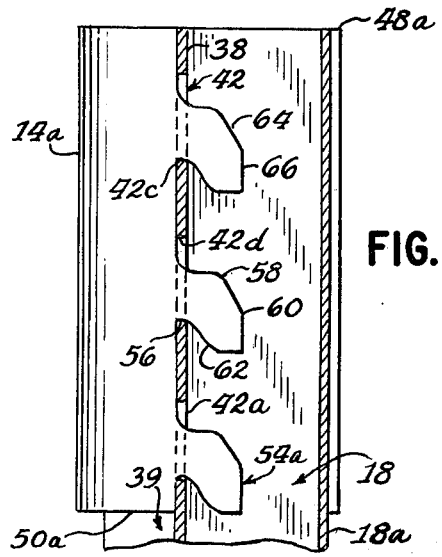
FIG. 6

4,287,994

WEDGABLE STORAGE RACK

BACKGROUND OF THE INVENTION

This invention relates to storage racks, and more particularly, to a storage rack that can be readily and securely assembled without the use of supplemental fasteners.

Over the years a variety of different types of storage racks have been developed. One type of storage rack is the "permanent" or "stationary" storage rack, in which horizontal beams are welded, bolted or otherwise permanently secured to upright posts. Assembly of these permanent type storage racks is often difficult, tedious and cumbersome. Moreover, these permanent storage racks cannot be readily collapsed for storage.

Another type of storage rack is the "knockdown" or "collapsible" storage rack in which horizontal beams are removably connected to upright posts for selective connection and disconnection. Knockdown storage racks have upright posts, which are typically rectangular in shape or channel-shaped. Usually, the front face of each of the upright posts includes at least one and often two rows of vertically spaced apertures for receiving lug-type connectors extending from the flanged end plates of the horizontal beams to connect the beams to the posts.

One type of connector, which is particularly advantageous with perforated posts, that is, posts having a multitude of apertures or slots, is the hook-type connector shown in U.S. Pat. Nos. 2,760,650, 3,490,604 and 3,871,525, which is sold by Unarco Industries, Inc. under the trademark Safety Wedge Lock.

One problem with some of the Knockdown storage racks is that they have a tendency to wobble and shift in both the lateral or longitudinal directions under load, such as when the storage rack is accidentally struck by a forklift truck. This problem occurs because knockdown storage racks do not usually have a rigid interconnection between the horizontal beams and the posts in both the longitudinal and lateral directions. Excessive shifting may cause damage to the goods stored on the rack, and may present a safety harard to personnel working in the area.

It is therefore desirable to provide an improved knockdown storage rack that overcomes most, if not all, of the preceding problems.

SUMMARY OF THE INVENTION

An improved knockdown storage rack is provided that can be readily assembled and disassembled without the use of supplemental fasteners or the like, and which minimizes shifting and wobbling under load.

Each upright post of the storage rack has a front face portion that faces laterally outward away from the interior of the storage rack and a pair of end face portions which are connected to the front face portion. In the preferred form, the front face portion includes a recessed front wall that is spaced laterally inward from the intersections of the end face portions and the front face portion, and which defines a plurality of finger-receiving openings. Advantageously, each of the finger-receiving openings has at least one inclined side, and preferably a pair of upwardly diverging sides, that provides wedging surfaces sloping downwardly and away from their adjacent end face portions to wedgingly receive horizontal load-carrying beam assemblies. In the preferred form, each of the finger-receiving openings is trapezoidal.

Each of the horizontal beam assemblies includes an elongated load-carrying beam that extends generally horizontally in the longitudinal direction. A specially configured wedging connector assembly is secured to each end of the load-carrying beam to detachably connect and wedgingly secure the beam to one of the posts. In the preferred embodiment, the wedging connector assembly is generally J-shaped in cross section, as viewed from either the top or bottom, and has an elongated abutment plate that lies generally transverse to the longitudinal direction of the beam to abuttingly engage and bear against one of the end face portions of the post. The wedging connector assembly also has as arm plate that extends arcuately from the elongated abutment plate and a plurality of downwardly extending hook-shaped camming fingers that extend laterally inwardly from the arm plate to engage the finger-receiving openings for generally preventing substantial downward movement of the beam under load.

Each of the hook-shaped fingers has a camming portion positioned substantially parallel to a corresponding wedging surface of one of the finger-receiving openings. When assembled, the camming portion cammingly engages and interlockingly wedges against the wedging surface so as to substantially prevent longitudinal and lateral shifting and wobbling of the beam under load and upon forklift impact. In the illustrative embodiment the camming portion is inclined downwardly in the longitudinal direction away from the elongated abutment plate and is positioned at an angle of inclination relative to the arm plate.

In order to clampingly and compressively embrace the post and assure a rigid wedging interconnection between the beam and post, the distance between the elongated abutment plate and any given location on the camming portion of one of the hook-shaped camming fingers, when the wedging connector assembly is detached from the post, is normally less than the longitudinal distance between the end face portion of the post and the corresponding wedging surface of the finger-receiving openings at the location of the wedging surface corresponding to the given location on the camming portion, and the wedging connector assembly is expandable under the combined weight of the beam and its load to clampingly embrace and wedgingly engage the post.

A more detailed explanation of the invention is provided in the following description and appended claims taken in conjunction with the accompanying drawings.

BRIEF DESCRIPTION OF THE DRAWINGS

FIG. 1 is a perspective view of a wedgable storage rack in accordance with principles of the present invention;

FIG. 2 is an enlarged exploded view of portions of a horizontal load-carrying beam assembly and an upright post of the wedgable storage rack;

FIG. 3 is a front view of portions of two adjacent horizontal beam assemblies and an upright post with portions of the horizontal beam assemblies broken away for ease of understanding;

FIG. 4 is a cross-sectional top view of the horizontal beam assemblies and upright post taken substantially along line 4—4 of FIG. 3;

FIG. 5 is a side view of the beam assembly and the upright post, shown partially in cross-section, taken substantially along line 5—5 of FIG. 4 and illustrating the beam assembly's hook-shaped fingers partially seated and wedged upon the post; and FIG. 6 is a side view similar to FIG. 5 but with the hook-shaped fingers completely seated and wedged upon the post.

DETAILED DESCRIPTION OF THE ILLUSTRATIVE EMBODIMENT

FIG. 1 of the drawings illustrates a wedgable, knockdown and collapsible storage rack 10 which can be readily and easily assembled without the use of supplemental fasteners, such as bolts, screws, etc. The storage rack 10 is particularly useful for supporting load-carrying pallets, which are inserted and removed from the storage rack 10 via a forklift truck. The storage rack 10 can also be useful for carrying other articles and loads.

In the illustrative embodiment the storage rack 10 has a pair of adjacent storage rack sections or modules 12 and 13 (FIG. 1), which are securely connected in an end-to-end array via wedging connector assemblies 14. Additional storage rack sections or modules can be attached with use of the wedging connector assemblies 14.

Storage rack 10 has a plurality of generally horizontal load-carrying beam assemblies or support bar assemblies 16 (FIG. 1) which are connectable to a plurality of upright apertured posts 18 of upright frames 19. Each horizontal load-carrying beam assembly 16 includes an elongated generally horizontal load-carrying beam 20 extending in the longitudinal direction, such as beam 20a and beam 20b, and has a pair of symmetrical wedging connector assemblies 14 secured to the opposite ends of the beam 20 for snap-fittingly interlocking engagement with posts 18 so as to detachably connect and wedgingly secure the beam 20 to the post 18 substantially without longitudinal and lateral shifting and wobbling of the beam 20 under load and upon accidental forklift impact. In the preferred embodiment, the beam assemblies 16 and posts 18 are made of metal, such as steel. Other types of metal can also be used.

In FIG. 1 adjacent horizontal beams 20a and 20b are horizontally aligned with each other and are rigidly connected to an intermediate post 18a by symmetrical (mirror image) wedging connector assemblies 14a and 14b, respectively.

Each upright frame 19 (FIG. 1) has a plurality of horizontal crossbars 22, extending transversely in the lateral direction between and interconnecting posts 18, and has one or more diagonal braces 24 connecting the crossbars 22 to provide additional lateral support for the storage rack 10. In some circumstances it may also be desirable to mount supplementary horizontal crossbars, or a metal deck or fork entry bars, upon the beams 20 to provide further support for the load.

In the preferred embodiment, the beams 20 are tubular and have a generally rectangular cross-sectional configuration. While beams 20 such as just described are preferred, in some circumstances it may be desirable to use solid beams, composite beams, or beams having other cross-sectional configurations and shapes, such as open-sided beam or cylindrical beams.

Referring now to FIG. 4, symmetrical wedging connector assemblies 14a and 14b are generally J-shaped in cross-section with wedging connector assembly 14a being generally J-shaped in cross-section as viewed in bottom plan view and wedging connector assembly 14b being generally J-shaped in cross-section as viewed in top plan view. In the preferred form, wedging connector assemblies 14 are made of spring steel or other resilient metal with a hardness less than the hardness of the post 18 so as to be capable of flexing longitudinally to an expanded position when connected to posts 18.

As shown in FIGS. 2-6, post 18 is tubular with a front face portion 26, a back face portion 28 and end face portions 30 and 32. Front face portion 26 faces laterally outward away from the interior of the storage rack 10 and is generally tooth-shaped. Back face portion 28 faces laterally inward toward the interior of the storage rack 10. End face portions 30 and 32 are longitudinally opposed to each other and are positioned generally parallel to each other. End face portions 30 and 32 extend between and connect the front face portion 26 to the back face portion 28. In the illustrative embodiment, the front face portion 26 and the end face portions 30 and 32 are generally planar or flat and the back face portion 28 is generally perpendicular to the end face portions 30 and 32, although in some circumstances it may be desirable that the front face portion and the end face portions be curved or have some other configuration.

Each of the end face portions 30 and 32 (FIG. 4) face generally in the longitudinal direction, with left-hand end face portion 30 facing generally toward beam 20a and right-hand end face portion 32 facing generally toward beam 20b (see FIG. 1). End face portions 30 and 32 intersect the front face portion 26 at junctions to form rounded U-shaped load-bearing corners 34 and 36, respectively. In the illustrative embodiment, each of the end face portions 30 and 32 span a lateral length (width) slightly greater than the width of its attached beam 20a or 20b as viewed in top plan view. In some circumstances, it may be desirable to use end face portions having a different lateral length.

As best shown in FIGS. 2 and 4, front face portion 26 has a recessed apertured front wall 38 that is spaced laterally inward of the corners 34 and 36 and has a pair of outwardly diverging side walls 39 and 40 that connect the recessed front wall 38 to the corners 34 and 36. In the illustrative embodiment, the front wall 38 and side walls 39 and 40 are generally planar or flat. The intersection of the front wall 38 and side walls 39 and 40 form rounded corners to reduce stress. The front wall 38 is generally perpendicular to the end face portions 30 and 32 and spans a distance in the longitudinal direction substantially less than the minimum distance between the end face portions 30 and 32.

In order to facilitate a wedging rigid connection between the upright posts 18 and beam assemblies 16, the front wall 38 defines a plurality of generally trapezoidal-shaped finger-receiving openings or apertures 42 (FIGS. 2 and 3) that are positioned in general vertical alignment with each other. Each of the trapezoidal-shaped openings 42 has upwardly diverging inclined sides 42a and 42b, extending between and connecting the bottom 42c and top 42d of the finger-receiving opening 42. Top 42d is longer than bottom 42c. Inclined sides 42a and 42b are positioned at an obtuse angle of inclination relative to the bottom 42c for providing wedging surfaces 42a and 42b adjacent side walls 39 and 40, respectively. Wedging surfaces 42a and 42b slope downwardly and away from end face portions 30 and 32, respectively. In the illustrative embodiment the wedging surfaces 42a and 42b are positioned at an obtuse angle of inclination of about 96½ degrees relative to the bottom 42c. While this angle of inclination is preferred, other angles can be used, if desired. In the illustrative embodiment, sides 42a and 42b, bottom 42c, and top 42d are generally planar or straight. In some circumstances, however, it may be desirable that the sides, bottom and top of the finger-receiving openings be curved or have a different configuration or shape.

In the illustrative embodiment, each of the posts 18 has trapezoidal-shaped knockouts, tabs or punchings 46 that are frangibly connected to the posts 18. (See FIG. 2). The knockouts 46 when pushed inwardly into the interior of the post 18 form the trapezoidal-shaped openings 42. In some circumstances the knockouts 46 when pushed inwardly can remain detachably connected to the post 18 so as not to interfere with the assembly and connection of wedging connector assemblies 14. In other circumstances it may be preferred to break off the knockouts 46 so that they fall and collect in the bottom of the interior of the post 18.

Preferably, a desired number of knockouts 46 are pushed inwardly into the interior of posts 18 to form the desired number of trapezoidal openings 42 at the plant before the posts are shipped to the installation site. For example, knockouts spaced on three inch centers could be selectively pushed inward.

Generally T-shaped wedging plugs or anti-debris accumulating plugs 47 (FIG. 3) made of plastic or other material are wedgingly inserted in the post openings 42 after the wedging connector assemblies 14 have been installed and connected to the posts 18 to fill any gaps or space in the post openings 42 not occupied by the wedging connector assemblies 14. The plugs 47 serve to plug up the openings 42 to prevent accumulation of comestible material and other debris within the interior of the post, which might otherwise attract vermin, insects etc. and present an unsanitary and unacceptable condition. The plugs 47, therefore, help provide a clean sanitary storage rack 10 which is particularly advantageous to the food industry such as for warehouses storing food products.

Structurally, each wedging connector assembly 14a and 14b (FIG. 4) has an elongated abutment plate 48a or 48b which is firmly connected and secured, such as by welding, to the beam 20a or 20b, from which it extends. When storage rack 10 is assembled, elongated abutment plates 48a and 48b are positioned generally parallel to each other and extend in the lateral direction. In the illustrative embodiment, elongated abutment plates 48a and 48b are generally planar or flat and are shaped complementary to the end face portions 30 and 32 of the post 18. In the preferred embodiment, elongated abutment plates 48a and 48b are of a size to abuttingly engage and bear against most of the lateral length of end face portions 30 and 32, respectively, as viewed in top plan view. In some circumstances, however, it may be desirable to have smaller abutment plates which do not abuttingly engage and bear against most of the lateral length of the end face portions 30 and 32. Furthermore, in those circumstances where it is desirable to use posts having curved end face portions, elongated abutment plates should have a similar complementary configuration.

Each of the wedging connector assemblies 14a and 14b also have an arm plate 50a or 50b (FIG. 4) which extends at an angle relative to its associated elongated abutment plate 48a or 48b. In the illustrative embodiment, the arm plates 50a and 50b are generally planar or straight and are substantially shorter than the elongated abutment plates 48a and 48b. When the storage rack 10 is assembled, arm plates 50a and 50b are spaced closely adjacent and generally parallel to the side walls 39 and 40, respectively. A generally U-shaped, rounded connecting portion (bight) 52a or 52b integrally connects the arm plate 50a or 50b to the elongated abutment plate 48a or 48b. In the illustrative embodiment, each arm plate 50a and 50b is inclined at an angle of about 20 degrees relative to its attached elongated abutment plate 48a or 48b. While this angle of inclination is preferred, other angles can be used, if desired. In some circumstances, it may be desirable to use arcuate arm plates.

As shown in FIGS. 2–6, a set of downwardly extending hook-shaped camming fingers 54a or 54b extend laterally inward from the innermost edge 49a or 49b of arm plate 50a or 50b. Preferably, the hook-shaped camming fingers of each set are positioned in general vertical alignment with each other and are in registration with the trapezoidal-shaped finger-receiving openings 42 to engage the trapezoidal-shaped openings 42. In the illustrative embodiment, each of the wedging connector assemblies 14a and 14b has three hook-shaped camming fingers 54a and 54b (FIG. 3), although in some circumstances it may be desirable to have more or fewer hook-shaped camming fingers.

Each of the fingers 54a and 54b has an inverted generally U-shaped crotch 56 (FIGS. 5 and 6) along its underside, located adjacent the arm plate 50a or 50b, to hook upon and be supported by the bottom 42c of a finger-receiving opening 42. When storage rack 10 is assembled, crotch 56 generally prevents substantial downward movement of its attached beam 20a or 20b. The top side of each finger 54a and 54b has a rounded knuckle 58 (FIGS. 5 and 6) positioned laterally inward of the crotch 56. A fingertip 60 integrally extends generally downward from the knuckle 58. The underside 62 of each fingertip 60 is curved or arcuate with a convex configuration that faces generally laterally outward to facilitate entry of the fingers 54a and 54b on the bottom 42c of the openings 42.

In order to facilitate ease of entry of the fingers 54a and 54b and the top 42d of the openings 42, each fingertip 60 has an inclined upper edge 64 sloping laterally inwardly and downwardly. In the illustrative embodiment the leading face 66 of each fingertip 60 is vertical.

Advantageously, each of the hook-shaped fingers 54a and 54b has a camming portion 68 (FIG. 3) that generally faces its attached elongated abutment plate 48a or 48b. In the preferred embodiment, the camming portions 68a of the left-hand wedging connector assembly 14a (FIGS. 3 and 4) are positioned substantially parallel to the left-hand wedging surfaces 42a, and the camming portion 68b of the right-hand wedging connector assembly 14b are positioned generally parallel to the right-hand wedging surfaces 42b. Each camming portion 68a and 68b is inclined at an angle of inclination relative to its attached arm plate 50a or 50b as well as to a vertical plane, such as vertical portions 30 and 32 (FIGS. 2 and 4) of the post 18. In the illustrative embodiment, each of the camming portions 68a and 68b is twisted at about a 6½ degree angle relative to a vertical plane. While this angle of inclination is preferred, other angles of inclination can be used, if desired.

When assembled and connected, camming portions 68a and 68b cammingly engage and interlockingly wedge against the wedging surfaces 42a and 42b, respectively. The amount of wedging increases (until U-shaped crotches 56 of fingers 54 are fully sealed against the associated bottoms 42c of finger-receiving openings 42) as heavier loads are placed upon the beams 20, i.e., the beams 20a and 20b move slightly downward with increased load to increase the wedging interconnection and resistance to separation between the camming portions 68a and 68b and the wedging surfaces 42a and 42b.

In order to clampingly embrace and wedgingly engage the posts 18, each of the wedging connector assemblies 14 is constructed and arranged to span a minimum longitudinal distance, between the elongated abutment plate 48a or 48b and any given location on the camming portion 68a or 68b of one of the hook-shaped camming fingers 54a or 54b when the wedging connector assembly 14a or 14b is detached and spaced away from the post 18, that is normally less than the longitudinal span or distance between the end face portion 30 or 32 of the post 18 and the corresponding wedging surface 42a or 42b of the trapezoidal-shaped finger-receiving openings 42 at the location on the wedging surface 42a or 42b that corresponds to the above location on the camming portion 68a or 68b. When connected to the posts 18, the wedging connector assemblies 14 expand to a distance slightly greater than the longitudinal span between the end face portion 30 or 32 and the wedging surfaces 42a or 42b, respectively, under the combined weight of the beam 20a or 20b and its load.

In order to obtain the desired interconnection, the ratio of the lateral distance or span X (FIG. 4) between the inward or vertical edge 51a or 51b of the arm plates 50a and 50b and the U-shaped connecting portion 52a or 52b, to the lateral distance or span between the inward end or vertical edge 49a or 49b of the elongated abutment plate 48a or 48b and the U-shaped connection portion 52a or 52b, respectively, is in the range of from about 1:4 to about 1:2. One preferred ratio is about 1:3. Most preferably, the ratio is about 1:2.

To assemble the storage rack 10, each beam 20 is sequentially raised to the desired height where the hook-shaped camming fingers 54a and 54b are inserted into the trapezoidal-shaped openings 42. Thereafter, the beam assemblies 16 are moved slightly downward to effect wedging between the camming portions 68a or 68b and the wedging surfaces 42a or 42b. The wedging action will increase or deepen, as the beam 20 moves downwardly with increased load, until fingers 54 are fully seated in openings 42.

In order to remove or detach the beam assemblies 16 from the posts 18, the above procedure should be reversed.

The beam assemblies 16 can be raised or lowered to different heights by (a) pushing in knockouts 46 to form the post openings 42 at the desired heights, (b) detaching the beam assemblies 18 to be raised or lowered, and (c) connecting the hooked-shaped camming fingers 54a and 54b of the beam's wedging connector assemblies 14 to the desired post openings in the manner described above. Trapezoidal-shaped wedging plugs or anti-debris accumulating plugs 70 (FIG. 2) made of plastic or other material can be wedgingly inserted in any open slots to prevent accumulation of comestible material and other debris. These features help provide for an adjustable, clean and sanitary storage rack 10.

Some of the many advantages of the above wedging interconnection are the tightness of its fit and its ability to effectively resist vertical and horizontal rotation—as well as longitudinal, lateral and vertical shifting—of the beam. This is attributable to the combined effect of the lateral offset of the recessed front wall of the post, the compressive engagement between the elongated abutment plate of the wedging connector assembly and the end face portion of the post, the wedging line contact in the longitudinal and vertical directions between the camming portions of the hook-shaped camming fingers and the wedging surfaces of the finger-receiving apertures (in contrast to vertical point contact between standard hook-shaped fingers and the bottom edge of slots in conventional non-wedging posts), and the overall interrelationship between the structural elements of the post and the wedging connector assembly.

It is believed that, because of the narrow span of the recessed front wall of the post, a thinner gauge material can be used for the post than in conventional storage racks and still effectively resist the moment and bending forces of the beam that tend to push the beam laterally outward (forward).

The preceding detailed description has been given for ease of understanding only. No unnecessary limitations are to be understood therefrom, as modifications will be obvious to those skilled in the art.

What is claimed is:

1. A storage rack, comprising:
an upright post having a front face portion facing laterally outward away from the interior of the storage rack and an end face portion facing generally in a longitudinal direction, said front face portion defining at least one finger-receiving opening having an inclined side providing a wedging surface sloping generally downwardly and away from said end face portion, said wedging surface spaced longitudinally from said end face portion;
an elongated load-carrying beam extending generally horizontally in the longitudinal direction; and
wedging connector means secured to said load-carrying beam for interlocking engagement with said post to detachably connect and wedgingly secure said beam to said post, said wedging connector means having an elongated abutment plate positioned generally transverse to the longitudinal direction for abuttingly engaging and bearing against said end face portion and having an arm plate extending arcuately from said elongated abutment plate for positioning adjacent said post, said wedging connector means having at least one downwardly extending hook-shaped camming finger extending laterally inwardly from said arm plate generally toward the interior of said storage rack for engaging said finger-receiving opening to generally prevent substantial downward movement of said beam under load, said hood-shaped finger having a camming portion disposed substantially parallel to said wedging surface for cammingly engaging and interlockingly wedging against said wedging surface, said camming portion spaced longitudinally from said elongated abutment plate, the minimum longitudinal distance between said camming portion and said elongated abutment plate at any given location on said camming portion when said wedging connector means is detached from said post being normally less than the longitudinal distance between said wedging surface of said finger-receiving opening and said end face portion of said post at the location on said wedging surface corresponding to said given location on said camming portion, and said wedging connector means being expandable under the combined weight of said beam and its load to clampingly embrace and wedgingly engage said post.

2. A storage rack in accordance with claim 1 wherein said finger-receiving opening is trapezoidal in shape, with upwardly diverging sides.

3. A storage rack in accordance with claim 1 wherein said camming portion is inclined generally downwardly in a direction away from said elongated abutment plate.

4. A storage rack in accordance with claim 1 wherein said wedging connector means is made of spring-like metal and has a hardness less than said post.

5. A storage rack in accordance with claim 1 wherein said front face portion of said post has a detachable knockout that defines said finger-receiving opening.

6. A storage rack in accordance with claim 5 further including an anti-debris accumulating plug to plug said finger-receiving opening.

7. A storage rack in accordance with claim 1 further including an anti-debris accumulating plug for insertion into said finger-receiving opening at a position generally adjacent said hook-shaped camming finger to substantially fill the unoccupied space of said opening.

8. A storage rack comprising:
an upright tubular post having a front face portion facing laterally outward away from the interior of the storage rack, a back face portion facing laterally inward toward the interior of said storage rack and a pair of longitudinally opposed end face portions extending between and connecting said front face portion to said back face portion, each of said end face portions facing generally in a longitudinal direction and intersecting said front face portion at a junction to form a load-bearing corner, said front face portion having a recessed front wall spaced laterally inward of said corners and defining a plurality of generally trapezoidal-shaped finger-receiving openings, said front face portion having side walls connecting said recessed front wall to said corners including one side wall positioned generally adjacent one of said end face portions and another side wall positioned generally adjacent the other of said end face portions, and each of said trapezoidal-shaped openings having a bottom and upwardly diverging sides spaced longitudinally from each of said end face portions and positioned at an obtuse angle of inclination relative to a portion of said bottom for providing a first wedging surface adjacent said one side wall and a second wedging surface adjacent said other side wall;
a load-carrying beam extending generally horizontally in the longitudinal direction; and
wedging connector means secured to said load-carrying beam for interlocking engagement with said post to detachably connect and wedgingly secure said beam to said post substantially without longitudinal and lateral shifting and wobbling of said beam under load and upon forklift impact, said wedging connector means being generally J-shaped in cross-section and including an elongated abutment plate positioned generally transverse to the longitudinal direction for abuttingly engaging and bearing against one of said end face portions, said wedging connector means having an arm plate for positioning adjacent said one side wall of the front face portion of said post and having a generally U-shaped connecting portion connecting said arm plate to said elongated abutment plate, a plurality of downwardly extending hook-shaped camming fingers extending laterally inward from said arm plate for engaging the sides of said trapezoidal-shaped openings, each of said fingers having an inverted generally U-shaped crotch for engaging and being supported by the bottom of one of said trapezoidal-shaped openings for generally preventing substantial downward movement of said beam under load and having a camming portion positioned substantially parallel to one of said wedging surfaces of said trapezoidal-shaped openings for cammingly engaging and interlockingly wedging against said wedging surface, said camming portion being spaced longitudinally from said elongated abutment plate, the minimum longitudinal distance between said camming portion and said elongated abutment plate at any given location on said camming portion when said wedging connector means is detached from said post being normally less than the longitudinal distance between the corresponding wedging surface of said trapezoidal-shaped openings and said end face portion of said post at the location on said wedging surface corresponding to said given location on said camming portion, and said wedging connector means being expandable under the combined weight of said beam and its load to clampingly embrace and wedgingly engage said post.

9. A storage rack in accordance with claim 8 wherein said arm plate has an inward end spaced laterally inward from said U-shaped connecting portion and said elongated abutment plate has an inward end spaced laterally inward from said U-shaped connecting portion, and the ratio of the lateral distances between said U-shaped connecting portion and the inward ends of said arm plate and said abutment plate, respectively, is in the range of from about 1:4 to about 1:2.

10. A storage rack in accordance with claim 9 wherein said ratio of the lateral distances between said U-shaped connecting portion and the inward ends of said arm plate and said elongated abutment plate, respectively, is about 1:3.

11. A storage rack in accordance with claim 9 wherein said ratio of the lateral distances between said U-shaped connecting portion and the inward ends of said arm plate and said elongated abutment plate, respectively, is about 1:2.

12. A storage rack in accordance with claim 8 wherein said load-bearing corner is generally U-shaped and said U-shaped connecting portion of the wedging connector means bears against said load-bearing corner.

13. A storage rack in accordance with claim 8 wherein:
said end face portion is generally planar and extends in a lateral direction; and
said recessed front wall is generally planar and is positioned substantially perpendicular to said end face portion.

14. A storage rack in accordance with claim 13 wherein said elongated abutment plate is of a size to bear against substantially all of said end face portion as viewed in top plan view.

15. A storage rack in accordance with claim 8 wherein said side walls of the front face portion diverge laterally outward from said recessed first wall to said load-bearing corners.

16. A storage rack in accordance with claim 8 wherein said camming portion is disposed at an angle of inclination relative to said arm plate.

17. A storage rack in accordance with claim 8 wherein said front face portion of said post has a plurality of generally trapezoidal-shaped knockouts detachably connected to said post for being pushed inwardly into the interior of said post to define said trapezoidal-shaped finger-receiving openings.

18. A storage rack in accordance with claim 17 further including at least one generally trapezoidal-shaped plug for insertion into and plugging one of said trapezoidal-shaped openings to substantially prevent debris from entering said trapezoidal-shaped openings.

19. A storage rack in accordance with claim 8 further including generally T-shaped plugs for insertion into said trapezoidal-shaped openings at positions generally adjacent said hook-shaped camming fingers to substantially fill the unoccupied spaces of said trapezoidal-shaped openings and prevent debris from entering said spaces.

20. A storage rack, comprising:
an upright post having a front face portion facing laterally outward away from the interior of the storage rack and an end face portion facing generally in a longitudinal direction, said front face portion having at least one generally trapezoidal-shaped knockout detachably connected to said post, said trapezoidal-shaped knockout defining at least one finger-receiving opening having an inclined side providing a wedging surface sloping generally downwardly and away from said end face portion, said wedging surface spaced longitudinally from said end face portion;
an elongated load-carrying beam extending generally horizontally in the longitudinal direction; and
wedging connector means secured to said load-carrying beam for interlocking engagement with said post to detachably connect and wedgingly secure said beam to said post, said wedging connector means having an elongated abutment plate positioned generally transverse to the longitudinal direction for abuttingly engaging and bearing against said end face portion and having an arm plate extending arcuately from said elongated abutment plate for positioning adjacent said post, said wedging connector means having at least one downwardly extending hook-shaped camming finger extending laterally inward from said arm plate generally toward the interior of said storage rack for engaging said finger-receiving opening to generally prevent substantial downward movement of said beam under load, said hook-shaped finger having a camming portion disposed substantially parallel to said wedging surface for cammingly engaging and interlockingly wedging against said wedging surface, said camming portion spaced longitudinally from said elongated abutment plate, the minimum longitudinal distance between said camming portion and said elongated abutment plate at any given location on said camming portion when said wedging connector means is detached from said post being normally less than the longitudinal distance between said wedging surface of said finger-receiving opening and said end face portion of said post at the location on said wedging surface corresponding to said given location on said camming portion, and said wedging connector means being expandable under the combined weight of said beam and its load to clampingly embrace and wedgingly engage said post.

21. A storage rack in accordance with claim 20 further including a generally trapezoidal shaped wedging plug for wedgably engaging and plugging said trapezoidal-shaped opening to substantially prevent debris from entering said trapezoidal-shaped opening.

22. A storage rack in accordance with claim 20 further including a generally T-shaped wedging plug for wedgably engaging and substantially filling the unoccupied space of said trapezoidal-shaped opening after said hook-shaped camming finger has cammingly engaged and wedged against said wedging surface to substantially prevent debris from entering said unoccupied space of said trapezoidal-shaped opening.

23. A storage rack comprising:
an upright tubular post having a front face portion facing laterally outward away from the interior of the storage rack, a back face portion facing laterally inward toward the interior of the storage rack and a pair of longitudinally opposed generally planar end face portions positioned generally parallel to each other and extending between and connecting said front face portion to said back face portion, each of said end face portions facing generally in the longitudinal direction and intersecting said front face portion at a junction to form a generally U-shaped load-bearing corner, said front face portion having a generally planar recessed front wall spanning a distance in the longitudinal direction less than the minimum distance between said end face portions and spaced laterally inward of said corners, said front face portion having a pair of outwardly diverging side walls connecting said recessed front wall to said corners including a first side wall positioned generally adjacent one of said end face portions and a second side wall positioned generally adjacent the other of said end face portions, said recessed front wall positioned substantially perpendicular to said end face portions and defining a plurality of generally trapezoidal-shaped finger-receiving openings positioned in general vertical alignment with each other, each of said trapezoidal-shaped openings having a generally planar bottom and generally planar upwardly diverging sides spaced longitudinally from each of said end face portions and positioned at an obtuse angle of inclination relative to said bottom for providing a first wedging surface adjacent said first side wall and a second wedging surface adjacent said second side wall;
a load-carrying beam extending in the longitudinal direction; and
wedging connector means secured to said load-carrying beam for interlocking engagement with said post to detachably connect and wedgingly secure said beam to said post substantially without longitudinal and lateral shifting and wobbling of said beam under load and upon forklift impact, said wedging connector means being generally J-shaped in cross section and including a generally planar elongated abutment plate extending in a lateral direction for abuttingly engaging and bearing against substantially all of one of said end face portions as viewed in top plan view, said wedging connector means having an arm plate extending at an angle relative to said elongated abutment plate for positioning adjacent said one of said side walls of said front face portion of said post and having a generally U-shaped connection portion connecting said arm plate to said elongated abutment plate for partially engaging and bearing against one of said corners, a plurality of downwardly extending hook-shaped camming fingers extending laterally inward from said arm plate for engaging the sides of said trapezoidal-shaped openings, each of said hook-shaped camming fingers having an inverted generally U-shaped crotch for engaging and being supported by the bottom of one of said trapezoidal-shaped openings for generally preventing substantial downward movement of said beam under load and having a camming portion positioned substantially parallel to one of said wedging surfaces of said trapezoidal-shaped openings and at an angle of inclination relative to said arm plate for cammingly engaging and interlockingly wedging against said wedging surface, said camming portion being spaced longitudinally from said elongated abutment plate, the minimum longitudinal distance between said camming portion and said elongated abutment plate at any given location on said camming portion when said wedging connector means is detached from said post being normally less than the longitudinal distance between the corresponding wedging surface of said trapezoidal-shaped openings and said end face portion of said post at the location on said wedging surface corresponding to said given location on said camming portion, and said wedging connector means being expandable under the combined weight of said beam and its load to clampingly embrace and wedgingly engage said post.

24. A storage rack comprising:

an upright tubular post having a front face portion facing laterally outward away from the interior of the storage rack, a back face portion facing laterally inward toward the interior of the storage rack and a pair of longitudinally opposed generally planar end face portions positioned generally parallel to each other and extending between and connecting said front face portion to said back face portion, each of said end face portions facing generally in the longitudinal direction and intersecting said front face portion at a junction to form a generally U-shaped load-bearing corner, said front face portion having a generally planar recessed front wall spanning a distance in the longitudinal direction less than the minimum distance between said end face portions and spaced laterally inward of said corners, said front face portion having a pair of outwardly diverging side walls connecting said recessed front wall to said corners including a first side wall positioned generally adjacent one of said end face portions and a second side wall positioned generally adjacent the other of said end face portions, said recessed front wall positioned substantially perpendicular to said end face portions and defining a plurality of generally trapezoidal-shaped finger-receiving openings positioned in general vertical alignment with each other, each of said trapezoidal-shaped openings having a generally planar bottom and generally planar upwardly diverging sides spaced longitudinally from each of said end face portions and positioned at an obtuse angle of inclination relative to said bottom for providing a first wedging surface adjacent said first side wall and a second wedging surface adjacent said second side wall;

a first load-carrying beam extending in the longitudinal direction;

first wedging connector means secured to said first load-carrying beam for interlocking engagement with said post to detachably connect and wedgingly secure said first beam to said post substantially without longitudinal and lateral shifting and wobbling of said first beam under load and upon forklift impact, said first wedging connector means being generally J-shaped in cross-section as viewed in bottom plan view and including a first generally planar elongated abutment plate extending in a lateral direction for abuttingly engaging and bearing against substantially all of one of said end face portions as viewed in top plan view, said first wedging connector means having a first arm plate extending at an angle relative to said first elongated abutment plate for positioning adjacent said first side wall of said front face portion of said post and having a first generally U-shaped connecting portion connecting said first arm plate to said first elongated abutment plate for partially engaging and bearing against one of said corners, a first set of downwardly extending hook-shaped camming fingers extending laterally inward from said first arm plate for engaging the sides of said trapezoidal-shaped openings, each of said hook-shaped camming fingers in said first set having a first inverted generally U-shaped crotch for engaging and being supported by the bottom of one of said trapezoidal-shaped openings for generally preventing substantial downward movement of said first beam under load and having a first camming portion positioned substantially parallel to said first wedging surface of one of said trapezoidal-shaped openings and at an angle of inclination relative to said first arm plate for cammingly engaging and interlockingly wedging against said first wedging surface, said first camming portion being spaced longitudinally from said first elongated abutment plate, the minimum longitudinal distance between said first camming portion and said first elongated abutment plate at any given location on said first camming portion when said first wedging connector means is detached from said post being normally less than the longitudinal distance between the corresponding first wedging surface of said first set of trapezoidal-shaped openings and said one end face portion of said post at the location on said first wedging surface corresponding to said given location on said first camming portion, and said first wedging connector means being expandable under the combined weight of said first beam and its load to clampingly embrace and wedgingly engage said post;

a second load-carrying beam extending generally horizontally in the longitudinal direction and in general horizontal alignment with said first load-carrying beam; and second wedging connector means secured to said second load-carrying beam for interlocking engagement with said post to detachably connect and wedgingly secure said second beam to said post substantially without longitudinal and lateral shifting and wobbling of said second beam under load, said second wedging connector means being generally J-shaped in cross-section as viewed in top plan view and being generally symmetrical to said first wedging connector means, said second wedging connector means including a second elongated abutment plate extending in the lateral direction and positioned generally parallel to said first elongated abutment plate for abuttingly engaging and bearing against substantially all of said other end face portion as viewed in top plan view, said second wedging connector means having a second arm plate extending at an angle relative to said second elongated abutment plate for positioning adjacent said second side wall of said front face portion of said post and having a second generally U-shaped connecting portion for connecting said second arm plate to said second elongated abutment plate for partially engaging and bearing against the other of said corners, a second set of downwardly extending hook-shaped camming fingers extending laterally inward from said second arm plate for engaging the sides of said trapezoidal-shaped openings at locations spaced generally adjacent said first set of hook-shaped camming fingers, each of said hook-shaped camming fingers of said second set having a second inverted generally U-shaped crotch for engaging and being supported by the bottom of one of said trapezoidal-shaped openings for generally preventing substantial downward movement of said second beam under load and having a second camming portion positioned substantially parallel to said second wedging surface of one of said trapezoidal-shaped openings and at an angle of inclination relative to said second arm plate for cammingly engaging and interlockingly wedging against said second wedging surface, said second camming portion being spaced longitudinally from said second elongated abutment plate, the minimum distance between said second camming portion and said second elongated abutment plate at any given location on said second camming portion when said second wedging connector means is detached from said post being normally less than the longitudinal distance between the corresponding second wedging surface of said second set of trapezoidal-shaped openings and said other end face portion of said post at the location on said second wedging surface corresponding to said given location on said second camming portion, and said second wedging connector means being expandable under the combined weight of said second beam and its load to clampingly embrace and wedgingly engage said post.

* * * * *